C. M. VAIL.
Atmospheric Cooler.
No. 70,136. Patented Oct. 22, 1867.
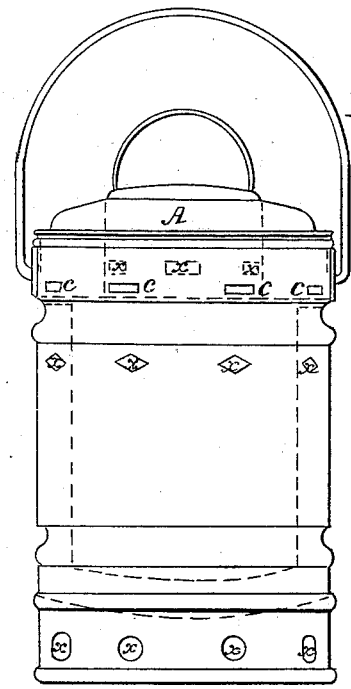
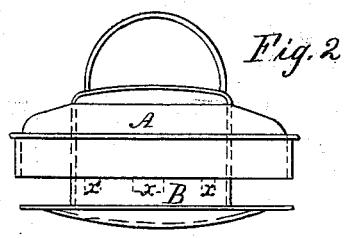
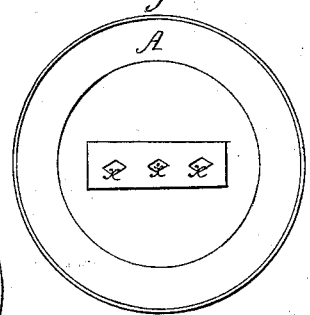
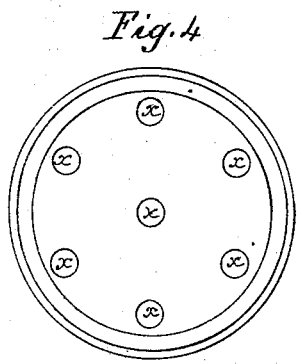
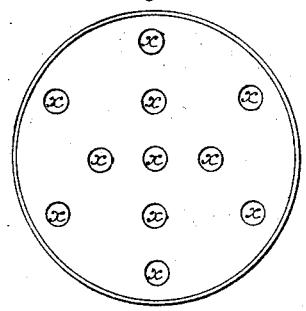
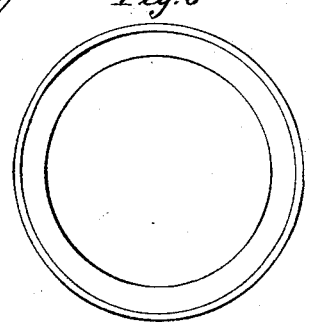
Witnesses
N. P. Fassett
Jerome B. White
Inventor
Charles M. Vail

United States Patent Office.

CHARLES M. VAIL, OF ELMIRA, NEW YORK.

Letters Patent No. 70,136, dated October 22, 1867.

IMPROVED COOLER FOR WATER, MILK, BEER, &c.

*The Schedule referred to in these Letters Patent and making part of the same.*

TO ALL WHOM IT MAY CONCERN:

Be it known that I, CHARLES M. VAIL, of the city of Elmira, Chemung county, State of New York, have invented a new and improved Method of Cooling Water, Beer, Milk, or any other liquid, together with any substance desirable to be kept cool; and I do hereby declare that the following is a full and exact description thereof, reference being had to the accompanying drawings, and to the letters of reference marked thereon.

The nature of my invention consists of a vessel of ordinary shape and size, such as a pail, pitcher, or can, composed of metal or wood, provided with an air-chamber surrounding it, with false bottom and double cover, with proper openings for ventilation, so that the atmosphere has free access from the bottom throughout the said air-chamber, and emerges near the top of the vessel, as clearly shown by the drawings accompanying these specifications, thus keeping the contents of said vessel cool.

To enable others skilled in the art to make and use my invention, I will proceed to describe its construction and operation.

I construct my atmospheric cooler by using any pail, pitcher, or can, of ordinary known form, composed of either metal or wood, and make a similar vessel a size larger, so as to leave an air-chamber of from half an inch or more, depending upon the size of the vessel to be made. I then make openings in the flange of the outer vessel, which should extend an inch or more below its bottom, (see round openings marked $x\ x$ in fig. 1.) I also make openings for ventilation in the bottom of the outer vessel, (see fig. 5, letters $x\ x$.)

Figure 1 represents an ordinary cylindrical tin pail.

Figure 5 represents the bottom of the outer vessel or pail.

I attach the inner vessel to the outer one at the top only, so that the air entirely surrounds it as it comes up from the bottom and passes out near the top, at openings marked $x\ x$ in fig. 1, thus completely ventilating and cooling the inner vessel and its contents. I then prepare a lid or cover, as shown in Figure 2, the top of which is ventilated, as shown in Figure 3, letters $x\ x$, with an inner cover, shown in Figure 4, ventilated by letters $x\ x$, which shuts down closely on top of the inner vessel or pail, and is connected by a cylinder, about an inch long, and about two-thirds the diameter of the cover, which cylinder is shown in fig. 2, marked B, and is ventilated by openings all around it, marked $x\ x$. I then make openings for ventilation in that part of the outer vessel or pail which extends above the inner vessel about an inch, which openings are shown in fig. 1, marked $c\ c\ c\ c$, thus allowing a current of air to pass between the covers and out at the top, and also allowing any vapor which may arise from the contents of the cooler to pass through the bottom cover, fig. 4, out at the top, thus completely surrounding the inner vessel with an air-chamber thoroughly ventilated, which will keep the contents of said vessel cool even in the hot sun of a summer day.

What I claim as my invention, and desire to secure by Letters Patent, is—

In combination with an internal vessel for containing the fluid to be acted upon, an external casing, with intermediate air-spaces, with a double cover and connecting ventilated cylinder, said parts being perforated and arranged in relation to one another substantially as set forth.

CHARLES M. VAIL.

Witnesses:
N. P. FASSETT,
JEROME B. WHITE.